United States Patent Office 3,567,671
Patented Mar. 2, 1971

3,567,671
TACK-FREE IMPREGNATED GLASS FIBER REINFORCEMENT FOR ELASTOMERIC MATERIALS
Nicholas S. Janetos, Providence, and Alfred Marzocchi, Cumberland, R.I., assignors to Owens-Corning Fiberglas Corporation
No Drawing. Filed Nov. 17, 1966, Ser. No. 595,036
Int. Cl. C08f 45/52
U.S. Cl. 260—28.5           4 Claims

ABSTRACT OF THE DISCLOSURE

The invention is addressed to glass fibers treated to improve their combination with elastomeric materials in the manufacture of glass fiber reinforced elastomeric products in which glass fibers are coated or bundles of glass fibers are impregnated with a composition formulated of a resorcinol aldehyde resin, a butadiene-styrene-vinyl pyridine terpolymer and a latex of carboxylated butadiene-styrene, acrylic resin or vinyl chloridevinylidene chloride copolymer and an incompatible wax which operates to reduce the tackiness of the treated or impregnated glass fibers to enable the treated fibers to be processed to the form desired for use in the combination with the elastomeric material but without impairing the bonded relationship between the treating material and the glass fibers or between the glass fibers and the elastomeric material of the continuous phase.

---

This invention relates to glass fiber-elastomeric products and more particularly to the treatment of glass fibers and to compositions employed in the practice of same for enhancing the utilization of the glass fibers in their combination with elastomeric materials as employed in the manufacture of elastomeric products reinforced with glass fibers, such as rubber belts, vehicle tires and the like.

Following the success achieved in the utilization of glass fibers as a reinforcement for synthetic resinous materials in the manufacture of structural elements of exceptionally high strength and resiliency, considerable effort is being expended towards the utilization of glass fibers as a reinforcement for elastomeric materials, such as in the production of driving belts, timing belts, vehicle tires and the like, wherein the glass fibers may offer considerable improvements in physical and mechanical properties such as increased dimensional stability, increased resiliency, higher strength, longer wear, greater safety and the like. Belts and tires of glass fiber reinforced materials have already indicated considerable merit in the above and others of the physical and mechanical properties.

Best results are secured when the glass fibers are embodied in the elastomeric system in the form of glass fiber bundle, such as strand, and preferably yarns and cords and fabrics woven thereof. Strands are formed of a multiplicity, usually hundreds, of glass fiber filaments which are gathered together during fiber formation and on which a glass fiber size is applied to the individual glass fibers before they are gathered together in the strand. In the preparation of glass fiber cords or yarns, a plurality of strands of glass fibers are twisted, intertwisted and/or plied in the conventional manner for cord, yarn or thread formation.

It has been found that, in order to maximize the strength and other properties sought to be secured from the glass fiber component, it is desirable to bring the greatest number of the fibers in the bundle into play as distinguished from the limited number of fibers arranged in the outside portions of the bundle in direct contact with the continuous phase elastomeric material and it is also desirable to provide for a strong and permanent bonded relationship between the glass fibers in the bundle and between the bundle of glass fibers and the elastomeric material.

For this purpose, it has been found desirable to effect impregnation of the bundle of glass fibers with a composition containing a curable elastomeric material whereby the impregnating composition is able (1) to cushion the fibers in the bundle to prevent destruction by mutual abrasion, (2) to provide resiliency between the glass fibers making up the bundle to enable realignment of the glass fibers in the direction of stress whereby a great proportion of the glass fibers can enter into the strengthening of the product, (3) to intertie the fibers one with another in the glass fiber bundle whereby the fibers tend to work together to enhance the resiliency and the strength of the glass fiber-elastomeric product, (4) to interbond the fibers in the bundle whereby fuller utilization can be made of the desirable properties of the glass fibers, and (5) to blend or otherwise form a monolithic combination with the continuous phase elastomer whereby the impregnated strand becomes an integral part of the elastomeric system with the elastomeric component of the impregnating composition blending with the substantially continuous phase to form a part thereof.

Treatment of the glass fibers in the form of single filaments or bundles to coat the individual glass fibers or to impregnate the bundle of glass fibers with a composition containing an elastomeric component has been found to be quite effective in maximizing the properties contributed by the glass fiber component, but treatment of the glass fibers with an elastomeric composition of the type described introduces a number of other problems which it is desired to overcome.

For example, the presence of an elastomeric material, in substantial amounts, as a component of a coating on the glass fiber surfaces or as a component in the impregnant of a glass fiber bundle, makes it difficult further to process the fiber component into yarns, cords, woven fabrics and the like, or to weave or otherwise arrange the strands, yarns or cords into the form desired for use as a reinforcement with the continuous phase elastomer. This is because of seizures which tend to occur between the treated glass fibers and bundles formed thereof whereby relative movements necessary for the desired processing are difficult to achieve.

Further, the elastomeric coating and impregnating compositions which have heretofore been developed constitute relatively complex systems which make use of a large number of expensive materials whereby the cost of the treating composition is relatively high.

Thus it is an object of this invention to produce a new and improved glass fiber bundle for use in combination with elastomeric materials in the manufacture of glass fiber reinforced elastomeric products and it is a related object to provide a new and improved impregnating and treating composition for use in same.

More specifically, it is an object of this invention to provide an impregnated bundle of glass fibers and composition for use in same in which the impregnating material is formed with an elastomeric base for the purpose of introducing the elastomeric component into the interior of the glass fibers bundle; in which the impregnating and treating composition is formulated of relatively low cost and readily available materials; which embodies a desirable balance between tack sufficient to interbond with the glass fibers of the bundle but insufficient to cause the bundles to adhere one to another in a spool or to seize one upon the other during the processing of the yarns, cords or fabrics thereby to enhance the tuilization of the treated bundle of glass fibers for combination with elastomeric materials; and in which the impregnating composition is formulated to contain components which will cure in combination with the elastomeric material forming the continuous phase thereby substantially to eliminate an interface between the impregnated bundle of glass fibers and the continuous phase elastomeric material.

The term "elastomer," as used herein to define the continuous phase, is meant to include natural rubber or synthetic rubbers such as butadiene-styrene copolymer, butadiene acrylonitrile copolymer, chloroprene, isoprene, neoprene, isobutyl rubber and the like elastomeric polymers and copolymers, in their cured or uncured stage or their vulcanized or unvulcanized stage.

The invention will be described with reference to a new and improved composition which can be employed as an original size applied to the glass fibers in forming thereby individually to coat each of the glass fiber filaments subsequently used to form the strand, yarn, cord or fabric and whereby the amount of treating composition which can be loaded into the bundle formed of the glass fibers can be materially increased by comparison with the introduction of the composition by impregnation.

In the preferred practice of this invention, the composition is formulated as an impregnating composition for the treatment of bundles of glass fibers in the form of strands, yarns, cords and fabrics for penetration of the treating composition into the strand, yarn, cord or fabric with the intention of individually coating the fibers to protect the fibers against destruction by mutual abrasion while establishing a bonded relationship therebetween, or else penetrating the glass fiber bundle sufficiently to intertie the impregnated glass fiber system with the continuous phase elastomeric materials with which the impregnated bundle of glass fibers is combined in the manufacture of glass fiber-elastomeric products.

The following examples will serve to illustrate the principal concepts of this invention in a composition and method for the treatment, as by the impregnation of bundles of glass fibers wherein the fibers have previously been sized in forming with a conventional size composition which has preferably been modified to embody a glass fiber anchoring agent.

For this purpose, use can be made of conventional glass fiber size compositions and methods of application to form the sized glass fiber bundle, as described in the copending application Ser. No. 400,517, filed Sept. 30, 1964, now abandoned, and entitled "Glass Fiber Reinforced Elastomers."

After the fibers have been processed into the glass fiber bundle, the bundle of glass fibers is impregnated with a low cost impregnating composition embodying the features of this invention to provide a bonded, relatively tack-free impregnated bundle of glass fibers which can be subsequently processed as by winding, twisting, weaving and the like in the transformation of the glass fiber bundles to the form desired for use as a reinforcement for the elastomeric material.

Impregnating compositions representative of the practice of this invention may be represented by the following:

EXAMPLE 1

Part A: Parts by weight
Distilled water _____ 732
Sodium hydroxide _____ 1
Resorcinol formaldehyde polymer in the form of a resin containing 75% solids (Penacolyte R-2170) _____ 48
Formalin (37% formaldehyde) _____ 16

Part B:
Butadiene - styrene - vinyl pyridine terpolymer (42% solids) _____ 900
Ammonium hydroxide _____ 80

Part C:
Water _____ 200
Ammonium hydroxide _____ 15
Vinyl chloride-vinylidene chloride copolymer (50% by weight solids—Dow Latex 874) __ 350
Microcrystalline paraffin wax (melting point 145–150° F.)—Vultex Wax Emulsion No. 5 of General Latex and Chemical Corp. (56% solids) _____ 200

EXAMPLE 2

Part A: Parts by weight
Distilled water _____ 732
Sodium hydroxide _____ 1.5
Resorcinol formaldehyde resin (75% solids) __ 60
Formalin _____ 20

Part B:
Rubber latex (Pliolite VP–100) (butadiene-styrene-vinyl pyridine terpolymer) _____ 900
Ammonium hydroxide _____ 80

Part C:
Water _____ 200
Ammonium hydroxide _____ 15
Pliolite 480 rubber latex _____ 350
Vultex Wax Emulsion No. 5 (56% solids) ____ 100

EXAMPLE 3

Part A: Parts by weight
Distilled water _____ 730
Tetramethyl ammonium hydroxide _____ 1.5
Resorcinol formaldehyde resin (75% solids) __ 48
Formalin _____ 16

Part B:
Butadiene - styrene - vinyl pyridine terpolymer (42% solids) _____ 900
Ammonium hydroxide _____ 80
Water _____ 100
Vinyl chloride-vinylidene chloride (Dow Latex 874) _____ 350
Vultex Wax No. 5 (56% solids) _____ 100
Acrylic resin (Rhoplex B85) (methyl methacrylate polymer) (38% solids) _____ 100

EXAMPLE 4

Part A: Parts by weight
Distilled water _____ 732
Ammonium hydroxide _____ 1.5
Resorcinol formaldehyde (42% solids) _____ 48
Formalin _____ 16

Part B:
Butadiene-styrene-vinyl pyridine terpolymer (42% solids) _____ 900
Ammonium hydroxide _____ 80
Carboxylated butadiene-styrene latex (50% solids) (Pliolite 480) _____ 350
Acrylic resin (50% solids) (Rhoplex B85) ___ 50
Vultex Wax No. 5 (56% solids) _____ 50

Part A in each of the above examples is separately prepared by combining the ingredients and then aging for about 2–3 hours with alkali present in an amount sufficient to adjust the pH between 7 and 7.5. The remainder of the ingredients are combined and the various parts are then mixed together. Aging of the entire mixture is not essential but beneficial results accrue, such as greater adhesion and stabilization of the mixture, after aging the entire mixture for from 10–24 hours before use to impregnate the glass fiber bundle.

Impregnation can be achieved by passing the glass fiber bundle downwardly into and through a bath of the impregnating composition and then upwardly through a wiper or die which is effective to work the impregnating composition into the interior of the bundle and to wipe excess impregnating composition from the impregnated bundle of glass fibers, as described in the aforementioned copending application.

The essential ingredients, consisting of the resorcinol formaldehyde resin, the butadiene-styrene-vinyl pyridine terpolymer, the latex and the wax component are present in the compositions of the above examples in about the following ratio, given in percent solids by weight:

|  | Percent |
|---|---|
| Resorcinol formaldehyde | 6 |
| Terpolymer | 54 |
| Elastomer in the form of a latex | 25 |
| Wax | 15 |

The resorcinol formaldehyde component, which contributes materially to the adhesion of the resulting composition onto the perfectly smooth and non-porous, hydrophilic glass fiber surfaces, can be employed in the composition in an amount within the range of 2–10% by weight and preferably in an amount within the range of 4–8% by weight on the solids basis. The resorcinol formaldehyde resin comprises the condensation reaction product of resorcinol and formaldehyde in the molecular ratio of about 2:1.

The terpolymer and the latex components are compatible with the resorcinol formaldehyde resin and operate to cushion the fibers and fill the interstices between fibers in the glass fiber bundle whereby the plurality of fibers making up the bundle are capable of realignment in the direction of stress for maximizing the high strength properties capable of being derived from the glass fiber component. The elastomeric components are also somewhat compatible with the elastomer materials forming the continuous phase of the glass fiber-elastomeric product thereby to permit blending therewith and advancement therewith to the cured or vulcanized stage whereby the impregnating material becomes an integral part of the rubber phase to tie in the bundle of glass fibers with the glass fiber component of the composite rubber system. The terpolymer can be employed in the impregnating composition in an amount within the range of 20–60% by weight and preferably 35–50% by weight of the solids and the latex solids can be employed in an amount within the range of 15–40% by weight and preferably 20–30% by weight of the solids.

The Vultex wax comprises a microcrystalline paraffin wax which is present in an amount in excess of that capable of remaining compatible with the solids making up the remainder of the impregnating composition whereby the wax component sweats out for concentration on the surfaces on the impregnated bundle of glass fibers to provide a non-tacky surface which enables the bundles to be processed into warns, threads, cords or fabrics and to be wound onto and unwound from spools without seizure or bonding notwithstanding the elastomeric material with which the bundles of glass fibers are impregnated. Thus the glass fiber bundle can be impregnated with a composition that exhibits good adhesion to the surfaces of the glass fibers without interfering with the subsequent processing characteristics of the glass fiber bundle for use in combination with the continuous phase elastomer and which also contains the desired elastomeric components in position to provide maximum protection to the glass fibers and to cooperate with the rubber of the continuous phase for fuller integration of the glass fiber system. Other paraffinic microcrystalline waxes having the described characteristics can be employed instead of the Vultex wax or in combination therewith in the amount described. The amount of microcrystalline wax can be varied within the range of 5–25% by weight and preferably 8–20% by weight of the impregnating solids.

Water is incorporated with the foregoing materials in the amount to produce an impregnating composition having a minimum solids content of about 10% and a maximum of about 50% by weight. Introduction is made in an amount to impregnate with dry solids of 5–25% by weight of the glass fiber system and preferably with a solids content of 10–15% by weight. With the foregoing compositions of Examples 1–4, loading in amounts within the range of 10–15% by weight solids can be easily achieved.

It is desirable to achieve as full impregnation as possible into the bundles of glass fibers in order more effectively to separate the fibers one from the other with the impregnating materials since the solids are effective to cushion the fibers and to protect the fibers from destruction by mutual abrasion. Thus it is desirable to achieve deep penetration into the glass fiber bundle. The deeper the penetration, the more effective will be the bond between the bundle of glass fibers and the elastomeric material with which the glass fibers are combined in the subsequent manufacture of the glass fiber-elastomeric product.

The elastomeric material with which the impregnated bundle of glass fibers are combined will constitute a continuous phase. Such continuous phase elastomer may be selected of rubbers of the type incorporated into the impregnating composition or the elastomeric material may differ therefrom. The continuous phase elastomer can be employed in the cured or uncured stage or in the vulcanized or unvulcanized state. It is believed that the tie-in between the impregnated bundle of glass fibers and the continuous phase elastomer occurs primarily during cure or vulcanization of the elastomeric materials during fabrication towards the final product.

More complete protection for the individual glass fibers and fuller coordination with the elastomeric material of the continuous phase can be achieved when the impregnating compositions of the foregoing examples are modified to enable use as a size composition applied to the individual glass fiber surfaces during forming wherein the size is applied to the individual glass fibers attenuated from the molten streams of glass issuing from the bottom side of a glass melting bushing and before the individual glass fibers are gathered together to form a yarn. For this purpose, the impregnating composition, representative of the practice of this invention, is modified to include an anchoring agent such as gamma-aminopropyltriethoxy silane. Instead of gamma-aminopropyltriethoxy silane in the size compositon or in the impregnating composition, use can be made of other organo silicon compounds in which an organic group attached to the silicon atom contains an amino group, such as gamma-aminopropyldiethoxy silane, gamma(triethoxysilylpropylamide) propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group such as glycydoxypropyltrimethoxy silane, or 3,4-epoxy-cyclohexylethyltrimethoxy silane, or a mercapto group such as mercapto propyltriethoxy silane. Instead of the organo silicon compounds, use can be made of Werner complex compounds in which the carboxylato group coordinated with the trivalent nuclear chromium atom contains an amino group or an epoxy group such as aminopropylato chromic chloride, glycine chromic complex, or glycylato chromic chloride. When used as a forming size, the impregnating compositions of the foregoing examples are further diluted with water to a solids content within the range of 5–30% by weight.

A forming size embodying the concepts of this invention can be formulated as follows:

EXAMPLE 5

|  | Parts by weight |
|---|---|
| Resorcinol formaldehyde resin | 2–10 |
| Butadiene-styrene-vinyl pyridine terpolymer | 20–60 |
| Latex solids | 15–40 |
| Microcrystalline paraffin wax | 5–30 |
| Anchoring agent | 0.1–3 |

EXAMPLE 6

| | Parts by weight |
|---|---|
| Resorcinol formaldehyde resin | 4–8 |
| Terpolymer | 35–50 |
| Latex solids | 20–30 |
| Microcrystalline paraffin wax | 10–20 |
| Anchoring agent | 0.1–3 |

The solids of the foregoing examples are formulated in the manner described in Examples 1–4 with the exception that the anchoring agent, such as gamma-aminopropyltriethoxy silane, is added to the system after hydrolyzation in aqueous medium, as by use of a quaternary amino hydroxide such as tetraethanol ammonium hydroxide or tetramethyl ammonium hydroxide and that the amount of water is increased for dilution of the solids to an amount within the range of 5–30% by weight. When applied as a size, it is possible to achieve a higher loading because of the individual coating of the glass fiber surfaces such that loading in the amount of 15–40% by weight of the sized glass fibers is possible.

The following is a specific example of the formulation to provide a size composition:

EXAMPLE 7

| | Parts by weight |
|---|---|
| Resorcinol formaldehyde resin (75% by weight solids) | 60 |
| Formalin | 20 |
| Sodium hydroxide | 1.5 |
| Butadiene-styrene-vinyl pyridine terpolymer (42% solids) | 900 |
| Ammonium hydroxide | 95 |
| Vinyl chloride-vinylidene chloride copolymer (50% solids) | 350 |
| Vultex Wax No. 5 (50% solids) | 200 |
| Gamma-aminopropyltriethoxy silane | 7 |
| Water in an amount to reduce the solids content to 15%. | |

When the glass fibers are sized in forming with a composition embodying the modification of this invention, the sized glass fibers remain sufficiently non-tacky for processing directly into yarns, strands, cords or fabrics for use in the combination with the continuous phase elastomer.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber reinforced belts or in the manufacture of rubber tires reinforced with cords of glass fibers. The combinations of glass fibers and elastomeric materials are then processed in a conventional manner by molding and cure under heat and pressure or by vulcanization for advancement of the elastomeric materials to a cured or vulcanized state while in combination with the treated glass fibers whereby the bundles of glass fibers become strongly integrated with the elastomeric material in the glass fiber-elastomeric product.

The polymeric materials, making up the bulk of the glass fiber treating or impregnating compositions of this invention, namely the terpolymer and latex, are capable of good flow during the vulcanization or cure to penetrate even more deeply into the glass fiber bundle to achieve an integral impregnated glass fiber yarn or bundle. This added flow also affords a more unitized structure between the impregnated bundle of glass fibers and the continuous phase elastomer to provide a greater degree of resin reenforcement by fuller utilization of the strength properties of the glass fibers.

It will be understood that the size compositions, represented by Examples 5, 6 and 7, may also be employed as impregnating compositions, preferably with lesser dilution by aqueous medium. The anchoring agent will continue to operate to facilitate the bonded relationship or integration between the elastomeric material of the glass fiber treating composition and the glass fiber surfaces.

It will be apparent from the foregoing that we have provided a new and improved composition for use in the treatment of glass fibers and preferably bundles formed thereof to enhance their utilization with elastomeric materials in the manufacture of glass fiber—elastomeric products while still retaining the desired degree of non-tackiness to enable the treated glass fiber bundle to be processed in substantially the conventional manner into cords, yarns or fabrics or other arrangements desired for use in the final product.

It will be understood that invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

We claim:

1. A composition for treatment of glass fibers for use in the combination of glass fiber-elastomeric products comprising an aqueous system the solids of which comprise 2–10 parts by weight of resorcinol formaldehyde resin, 20–60 parts by weight of butadiene-styrene-vinyl pyridine terpolymer, 15–40 parts by weight of a latex selected from the group consisting of a copolymer of vinyl chloride-vinylidene chloride, a carboxylated butadiene-styrene copolymer and polymethyl methacrylate resin and 5–30 parts by weight of an incompatible microcrystalline paraffin wax.

2. A composition as claimed in claim 1 in which the materials are present in an amount in the ratio of 4–8 parts by weight resorcinol formaldehyde resin, 35–50 parts by weight butadiene-styrene-vinyl pyridine terpolymer, 20–30 parts by weight latex, and 10–20 parts by weight of the incompatible wax.

3. A composition as claimed in claim 1 which includes an anchoring agent present in an amount within the range of 0.1 to 3 percent by weight.

4. A glass fiber bundle in which the bundle of glass fibers is impregnated with the composition of claim 1 containing elastomeric materials for interbonding with the glass fibers of the bundle and for interbonding with elastomeric materials with which the impregnated bundle of glass fibers are combined in the manufacture of glass fiber-elastomeric products and in which the waxy component of the impregnating composition is present in higher concentration on the surfaces of the impregnated bundle of glass fibers to provide lubricity which prevents interbonding of the bundle of glass fibers during processing.

References Cited

UNITED STATES PATENTS

| 2,429,397 | 10/1947 | Compton | 260—846 |
| 2,871,213 | 1/1959 | Gravlich | 260—846 |
| 3,281,311 | 10/1966 | Paul | 260—846 |
| 3,380,938 | 4/1968 | Jack | 260—28.5B |
| 3,437,610 | 4/1969 | Moult | 260—846 |

MORRIS LIEBMAN, Primary Examiner

P. R. MICHL, Assistant Examiner

U.S. Cl. X.R.

117—124; 260—228, 846